United States Patent
Sieberg

(10) Patent No.: US 6,557,997 B1
(45) Date of Patent: May 6, 2003

(54) CLIP-ON STYLE LENSES AND METHOD OF ASSEMBLY

(76) Inventor: John J. Sieberg, 21851 Huron Ln., Lake Forrest, CA (US) 92630

(*) Notice: Subject to any disclaimer, the term of this patent is extended or adjusted under 35 U.S.C. 154(b) by 0 days.

(21) Appl. No.: 10/241,957

(22) Filed: Sep. 11, 2002

(51) Int. Cl.[7] .................................. G02C 9/00
(52) U.S. Cl. ........................................... 351/47; 351/57
(58) Field of Search ............................. 351/47, 57, 44, 351/51, 158, 48, 58

(56) References Cited

U.S. PATENT DOCUMENTS

| | | | |
|---|---|---|---|
| 5,017,001 A | 5/1991 | Kooketsu | |
| 5,032,017 A | 7/1991 | Bolle et al. | |
| 5,889,574 A | * 3/1999 | Gandl-Schiller | 351/47 |
| 5,936,702 A | * 8/1999 | Cheong | 351/47 |
| 5,975,692 A | 11/1999 | Pedron et al. | |
| 5,980,036 A | 11/1999 | Solomon | |
| 6,007,197 A | 12/1999 | Locatelli | |
| D423,777 S | 5/2000 | Folisi | |
| 6,280,029 B1 | 8/2001 | Salk | |
| 6,341,864 B1 | 1/2002 | Ng | |
| 6,354,702 B2 | 3/2002 | Via | |
| 6,398,362 B1 | 6/2002 | Masunaga | |

* cited by examiner

*Primary Examiner*—Hung Xuan Dang
(74) *Attorney, Agent, or Firm*—Gene Scott-Patent Law & Venture Group

(57) ABSTRACT

A clip-on sunglasses has a pair of lenses with mounting holes. A pair of bridge clips are integrally joined at opposing ends of a bridge wire. A mounting tongue of each of the bridge clips is engaged with one of the mounting holes for securing the bridge wire to the lenses using the bridge clips. Upper mounting snaps are engaged with the bridge clips and the mounting hole. Each one of a pair of lower mounting snaps is engaged with a further one of the mounting holes in each of the lenses, the upper and lower mounting snaps each providing a hooked finger extending therefrom, the hooked fingers positioned for engagement about opposing edges of a pair of eyeglasses, enabling the lenses to be removably engaged over front surfaces of the eyeglasses.

6 Claims, 2 Drawing Sheets

CLIP-ON STYLE LENSES AND METHOD OF ASSEMBLY

BACKGROUND OF THE INVENTION

INCORPORATION BY REFERENCE: Applicant(s) hereby incorporate herein by reference, any and all U.S. patents, U.S. patent applications, and other documents and printed matter cited or referred to in this application.

1. Field of the Invention

This invention relates generally to clip-on style lenses and more particularly to a pair of lenses such as sunglasses having an improved construction and assembly method.

2. Description of Related Art

The following art defines the present state of this field:

Folisi, U.S. Des. 423,777 describes a sunglass holder design.

Kooketsu, U.S. Pat. No. 5,017,001 describes individual lenses of subsidiary glasses, such as sun glasses, that are attached to lenses of ordinary glasses by means of three fasteners, each in the shape of a square arch, made of synthetic resin and each provided, at about the middle of the arch, with an inner projection to form front and rear fitting portions at the front and rear sides of the projections respectively. The three fasteners are fitted respectively, with the front fitting portions, in three grooves provided in the periphery of the subsidiary lens and secured in place. The grooves are located so that lines connecting them form a triangle, with the distance between upper and lower fasteners located near the bridge of the ordinary glasses being larger than the outside diameter, in a vertical direction, of the ordinary glasses. This permits the lens of the subsidiary glasses to be fitted and removed from the lens of ordinary glasses in a direction transverse thereto.

Bolle et al., U.S. Pat. No. 5,032,017 describes spectacles comprising two eyepieces joined by a bridge, each eyepiece comprising a first end by which it is connected to the said bridge, and a second end, remote from the first one, to which is fixed a side-piece. According to the invention, each side-piece has on one end a clip comprising two wings placed opposite each other, between which extends the said second end of the eyepiece, one of the wings bearing elastic retaining means arranged to cooperate with corresponding means provided on the eyepiece in such a way as to ensure a given positioning of the clip in relation to the eyepiece. Application to the manufacture of novelty spectacles.

Pedron et al., U.S. Pat. No. 5,975,692 describes a device for connecting monolithic tinted lenses on a bridge of a pair of corrective eyeglasses, consisting of a first body which has first and second elements for temporary engagement at at least one seat formed on the lens and to the bridge. A second body is also provided which allows to temporarily lock the position of the first body on the lens.

Solomon, U.S. Pat. No. 5,980,036 describes an eyeglass device including a frame supporting first and second lenses therein. The frame includes support hooks and latch assemblies that permit the securing of third and fourth lenses to the frame over a respective first and second lens. Alternatively, an auxiliary frame is fastened to the frame using securing members attached to the auxiliary frame, the frame, or both the auxiliary frame and the frame.

Locatelli, U.S. Pat. No. 6,007,197 describes a deformable hook for removably securing a monocular screen to an eyeglass. The hook includes a first end portion for fixing to said screen, a second end portion for contacting with a peripheral surface of said eyeglass, and a central portion interconnecting the first and second end portions and for passing over an edge surface of the eyeglass. The first and second end portions include a pin portion extendable through an orifice in a periphery of the screen. The hook is a solid body, and the first end portion is preferably of a rectilinear shape extending along a longitudinal axis.

Salk, U.S. Pat. No. 6,280,029 describes an improved construction for custom clip-on accessories for spectacles including a pair of accessory lens components that are shaped to conform to the lenses of a pair of spectacles. A pair of clasp components are secured to upper edge portions of respective accessory lenses, and a bridge member joins the two upper clasps to form an assembly thereof. In addition, a pair of lower clasps are secured to lower edge portions of the respective accessory lenses. The upper and lower clasps include bracket portions that engage the frame (or, in frameless spectacles, the edges of the ophthalmic lenses) and removably retain the clip-on assembly to the spectacles. Each clasp includes a channel-like opening for receiving the edge portion of the accessory lens. The channel is formed of a stiff, form-retaining metal that may be crimped to contract onto the edge portion of the accessory lens. Moreover, a sharp, tooth-like projection extends into the channel opening from one side thereof, and is designed to penetrate and perforate the accessory lens. The projection prevents removal of the clasp as long as the channel opening remains crimped onto the edge portion, and this engagement obviates the need for any adhesive for joining the clasp to the accessory lens. As a result, a simple crimping operation replaces the prior art gluing step, and eliminates the need for any clean-up step following gluing.

Ng, U.S. Pat. No. 6,341,864 describes an auxiliary spectacle apparatus wherein auxiliary lenses have an elastic clip configured in the shape of a half arch for releasably engaging the primary spectacles.

Via, U.S. Pat. No. 6,354,702 describes support for auxiliary lenses able to associate auxiliary lenses with glasses comprising a frame supporting main lenses, for each of said auxiliary lenses said support comprising at least two attachment elements arranged along the edge of said lens, each of said attachment elements comprising at least a substantially U-shaped segment, equipped with elastic means to couple with a lens, at least the attachment elements comprising a hook-shaped extension able to anchor itself to the frame of the glasses.

Masunaga, U.S. Pat. No. 6,398,362 describes a clip-on attachment assembly for spectacles, which takes advantage of such prior clip-on attachment spectacles as the bridge portion thereof elastically contracts and extends so as to be secured to the frontal surface of the lenses of the spectacles in use, but which structurally facilitates not only the extension and contraction of the bridge portion, but also the engagement between the bridge portion of the attachment spectacles and the glasses thereof as well as that between the hooks to be hung onto the lenses of the spectacles in use and the attachment glasses.

The prior art describes individual lenses of subsidiary glasses; two eyepieces joined by a bridge; locking clip-on lenses; support hooks and latch assemblies; a deformable hook for removably securing a monocular screen to an eyeglass; lens components that are shaped to conform to the lenses of a pair of spectacles; an elastic clip configured in the shape of a half arch; a substantially U-shaped segment, equipped with elastic means to couple with a lens, attachment elements including a hook-shaped extension able to anchor itself to the frame of a glasses; and a bridge portion able to elastically contract and extend; but does not teach the instant snap-on hardware fixtures for preparing a pair of clip-on sunglasses using round holes and engaging clips. The present invention fulfills these needs and provides further related advantages as described in the following summary.

SUMMARY OF THE INVENTION

The present invention teaches certain benefits in construction and use which give rise to the objectives described below.

Clip-on lenses, particularly sunglasses, are in general use by those who wear eyeglasses so that they need not acquire prescription sunglasses. Such "clip-ons" as they are referred to by the public, tend to be compact, easy to carry in a pocket and simple to mount onto eyeglasses. Typical drawbacks to the use of clip-ons are that they add weight to the eyeglasses and that the mounting clips are unsightly, usually being large and thus visually unappealing. The present invention overcomes both of these disadvantages, is cost effective to manufacture and assembly, and is rugged and durable. A pair of lenses are fitted with mounting holes. A pair of bridge clips are integrally joined at opposing ends of a bridge wire. A mounting tongue of each of the bridge clips is engaged with one of the mounting holes for securing the bridge wire to the lenses and thus requiring a smaller clip than has been known in the prior art. When clamped, serrations on the inside surfaces of the bridge clips dig-into the lens surface for improved rigid engagement. These metal clips provide improved strength and yet are covered by plastic snaps to avoid scratching the eyeglasses to which they are mounted. Upper mounting snaps are engaged with the bridge clips and the same mounting holes. Each one of a pair of lower mounting snaps is engaged with a further one of the mounting holes in each of the lenses, the upper and lower mounting snaps each providing a hooked finger extending therefrom, the hooked fingers positioned for engagement about opposing edges of a pair of eyeglasses, enabling the lenses to be removably engaged over front surfaces of the eyeglasses. Because of the structure of the clips and snaps, they are able to be mounted securely with smaller profiles and improved holding power.

A primary objective of the present invention is to provide an apparatus and method of use of such apparatus that provides advantages not taught by the prior art.

Another objective is to provide such an invention capable of improved rugged structure.

A further objective is to provide such an invention capable of improved appearance.

A still further objective is to provide such an invention capable of inexpensive fabrication and assembly.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
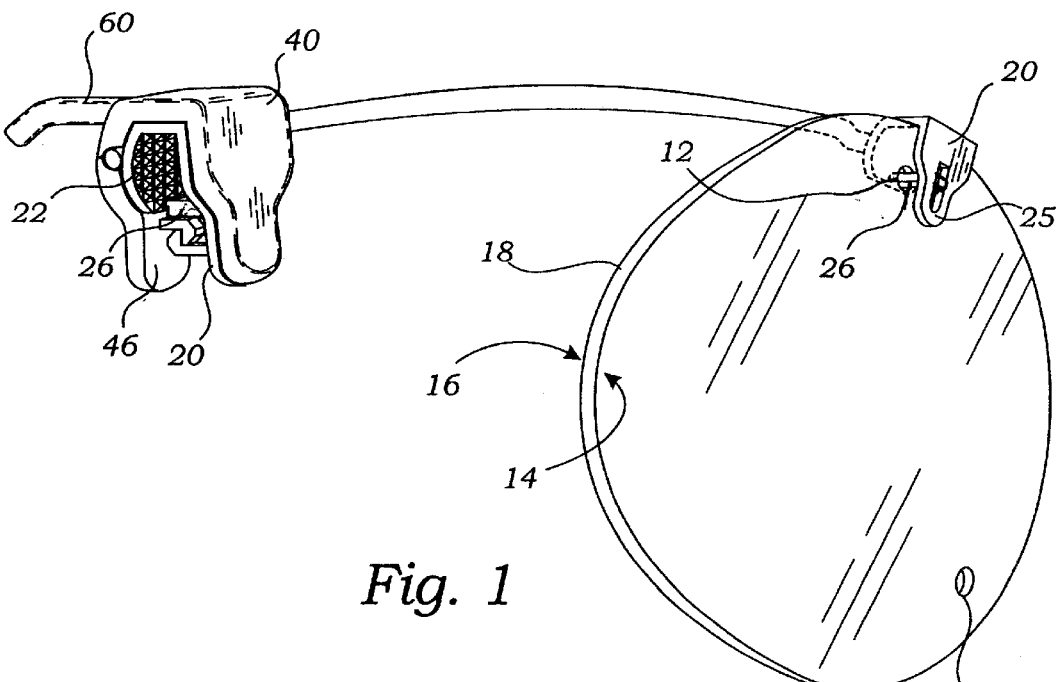
FIG. 1 is a perspective view of a first preferred embodiment of the invention illustrating assembly thereof with one lens.
Figure 2:
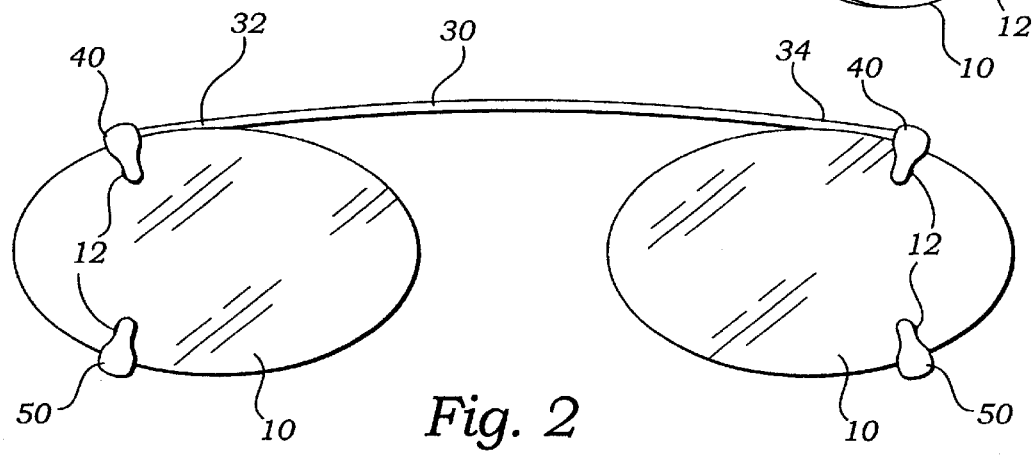
FIGS. 2 and 3 are front elevational views of the first, and a second preferred embodiments.
Figure 3:
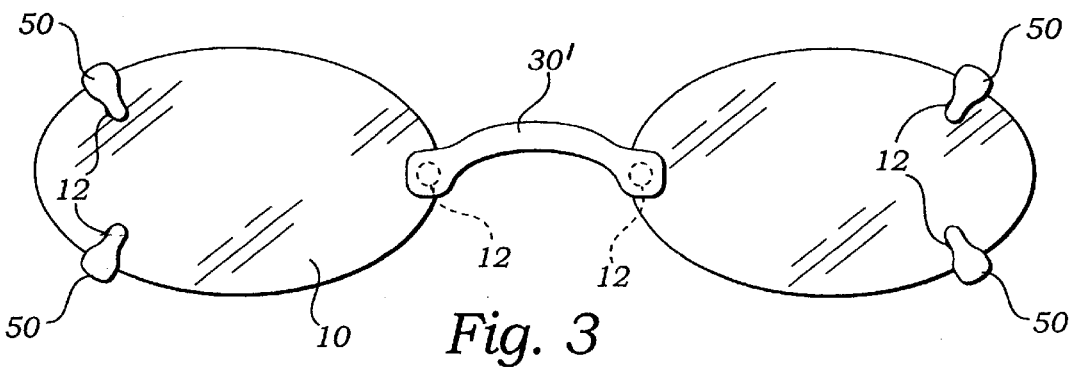
Figure 4:
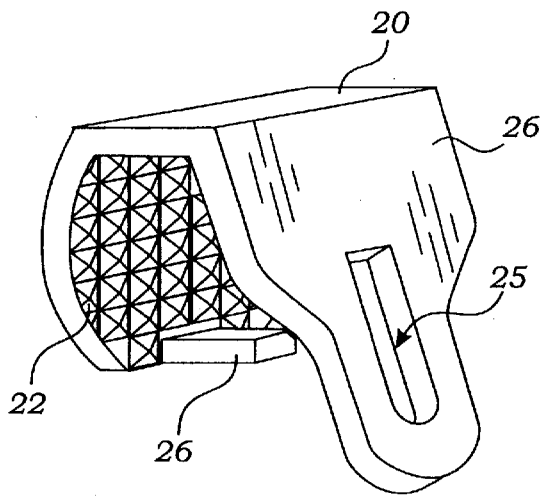
FIGS. 4 and 5 are frontal and rearward perspective views respectively, of a bridge clip of the first embodiment.
Figure 5:
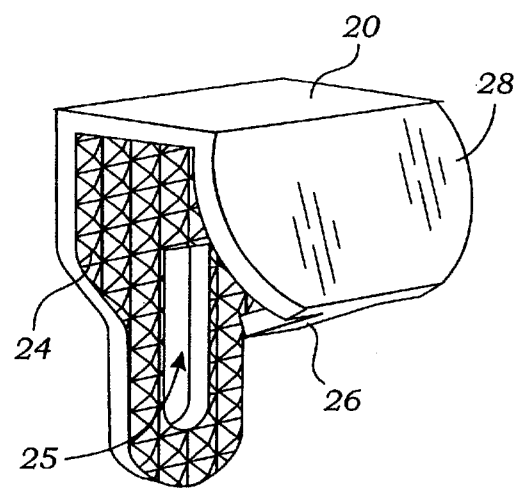
Figure 6:
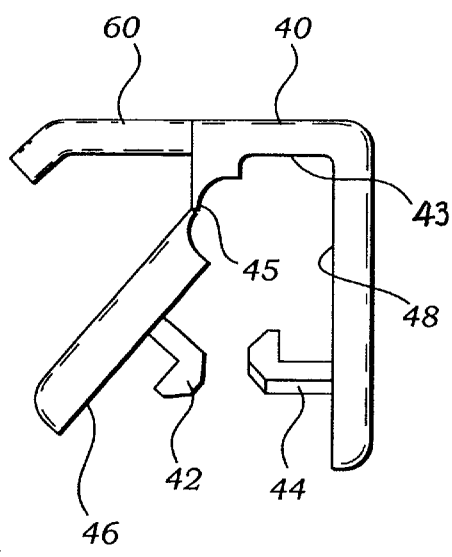
FIGS. 6 and 7 are side elevational views respectively of an upper and lower mounting snaps of the invention.
Figure 7:
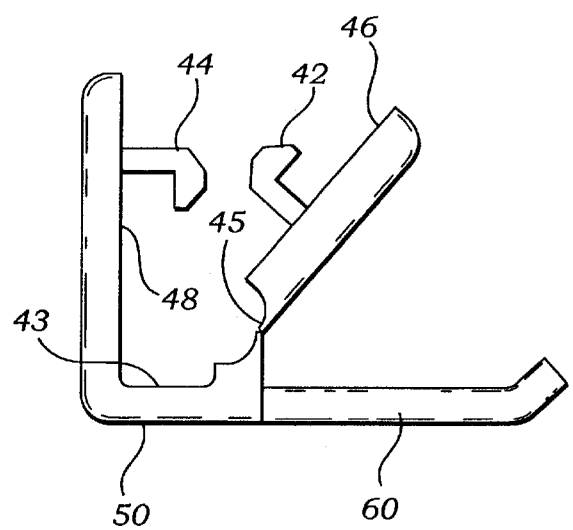

The present invention is a clip-on lenses apparatus comprising, in a first embodiment shown in FIGS. 1 and 2, a pair of lenses 10, preferably tinted lenses as used for reducing glare to the eyes of a wearer, i.e., sunglasses and certain attachment hardware as will be described in the following. In this discussion, the invention will be described as relating to a single lens 10, and since both lenses are treated in a similar manner, these comments will apply to both lenses 10. Now therefore, for the first embodiment, lens 10 provides two mounting holes 12. A bridge clip 20 is integrally joined, preferably by spot welding, at opposing ends 32, 34 of a bridge wire 30. A mounting tongue 26 of the bridge clip 20 (FIGS. 4 and 5) is engaged with an upper one of the two mounting holes 12. An upper mounting snap 40 is engaged with both the bridge clip 20 and the mounting hole 12 as is best seen in FIG. 1 at the left side. A lower mounting snap 50 is engaged with the other, lower one of the mounting holes 12, as shown in FIGS. 2 and 3. The upper 40 and lower 50 mounting snaps each provide a hooked finger 60 as best seen in FIGS. 6 and 7. The hooked fingers 60 are positioned for engagement about opposing edges of a pair of eyeglasses (not shown). This enables the apparatus to be removably engaged over the face of the eyeglasses as is well known in the art.

The bridge clip 20 is preferably a strong and rigid metal part providing opposing serrated surfaces 22, 24, and these surfaces are imbedded into opposing outer surfaces 14, 16 of lenses 10 when the clip 20 is closed against the surfaces 14, 16. Tongue 26 is engaged with the upper one of the holes 12 as shown in FIG. 1. It is shown, also in FIG. 1, that bridge clip provides an elongated hole 25 which receives clamping portions (described below) of upper mounting snap 40, and in this manner bridge clip 20 is secured by upper mounting snap 40, while snap 40, preferably being made of plastic, provides an outer surface which cannot scratch the surface of the eyeglasses to which the invention is mounted.

Preferably, the bridge wire 30 is spring tempered and flexed for securing the apparatus to the eyeglasses so that the apparatus is held in place by spring tension in the bridge wire 30 while hooked fingers 60 grip edges of the eyeglasses with compressive force, as is well known.

Preferably, both of the mounting snaps 40, 50 provide a pair of opposing hooks 42, 44 and a molded-in "living-hinge" 45, o that the mounting snaps 40, 50 are adapted for engagement within the mounting holes 12 to secure the first opposing surfaces 46, 48 of the upper mounting snap 40 against second opposing surfaces 26, 28 of bridge clip 20 and the first opposing surfaces 46, 48 of the lower mounting snap 50 against opposing outer surfaces 14, 16 of the lens.

In an alternate embodiment, the clip-on sunglasses apparatus, as shown in FIG. 3, comprises, as above, the pair of lenses 10 with the mounting holes 12 therein and an alternate bridge wire 30'. However, in this embodiment, the bridge wire 30' is engaged directly with at least two of the mounting holes 12 for joining the pair of lenses 10 in side-by-side juxtaposition without the use of bridge clips 20.

Again, discussing only one of the two lenses 10, a pair of the lower mounting snaps 50 are engaged with the mounting holes 12 and are positioned distally from the bridge wire 30', one of the lower mounting snaps 50 in the lower hole 12, and the other of the lower mounting snaps 50 in the upper hole 12. The mounting snaps 50 each provide the hooked finger 60 positioned for engagement about the opposing edges of a pair of eyeglasses, which enables the lenses 10 to be removably engaged with the eyeglasses in the same manner as described above. Both mounting snaps 50 provide a pair of opposing hooks 42, 44 as described above and shown in FIG. 7, adapted for mutual engagement within one of the mounting holes 12 so as to secure, by jamming, each of the mounting snaps 50 on lens 10 with inside surface 43 positioned against lens peripheral edge 18 to prevent rotation of snaps 50 within holes 12. Such jamming of the mounting snaps 50 against the peripheral edge of the lens is considered to clearly distinguish over the prior art.

As described above, in this further embodiment, the bridge wire 30' is spring tempered metal wire or plastic and flexed for securing the apparatus to the eyeglasses, so that it is held in place by spring tension in the bridge wire 30' with compressive griping of the hooked fingers 60 against opposing outer edge surfaces of the eyeglasses.

Clearly, the two embodiments of the present invention described above are not the only such embodiments possible using the principles defined above and sunglasses are not the only product that may be produced therefrom. For instance, workers in many industrial, scientific and consumers situations, may advantageously use such adapted clip-on devices to produce special optical effects such as enhanced depth perception, shade from ultraviolet radiation, and filtering out certain wavelengths or changing color.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A clip-on sunglasses apparatus comprising in combination: a pair of lenses, each of the lenses providing mounting holes therein; a pair of bridge clips integrally joined at opposing ends of a bridge wire; a mounting tongue of each one of the bridge clips engaged with one of the mounting holes in one of the lenses; each one of a pair of upper mounting snaps engaged with one of the bridge clips and the mounting hole thereof; and each one of a pair of lower mounting snaps engaged with a further one of the mounting holes; the upper and lower mounting snaps each providing a hooked finger, the hooked fingers positioned for engagement about opposing edges of a pair of eyeglasses, enabling the lenses to be removably engaged over front surfaces of the eyeglasses.

2. The apparatus of claim 1 wherein each one of the bridge clips provides opposing serrated surfaces imbedded into opposing outer surfaces of one of the lenses.

3. The apparatus of claim 1 wherein the bridge wire is spring tempered, whereby the bridge wire is flexed for securing the apparatus to the eyeglasses, the apparatus held thereon by spring tension in the bridge wire.

4. The apparatus of claim 1 wherein each of the mounting snaps provides a pair of opposing hooks, the hooks adapted for mutual engagement within one of the mounting holes so as to secure first opposing surfaces of the mounting snap against second opposing surfaces of bridge clips.

5. A clip-on sunglasses apparatus comprising in combination: a pair of lenses, each of the lenses providing mounting holes therein; a bridge wire engaged with at least two of the mounting holes for joining the pair of lenses in side-by-side juxtaposition; each one of a pair of mounting snaps engaged with the mounting holes of each one of the pair of lenses distally from the bridge wire; the mounting snaps each providing a hooked finger, the hooked fingers positioned for engagement about opposing edges of a pair of eyeglasses, enabling the lenses to be removably engaged over front surfaces of the eyeglasses; each of the mounting snaps providing a pair of opposing hooks, the hooks adapted for mutual engagement within one of the mounting holes and positioned to jam the mounting snap against the peripheral edge of the lens.

6. The apparatus of claim 5 wherein the bridge wire is spring tempered, whereby the bridge wire is flexed for securing the apparatus to the eyeglasses, the apparatus held thereon by spring tension in the bridge wire.

* * * * *